A. CROSBY.
BELT-SHIFTER.
No. 181,049. Patented Aug. 15, 1876.
Fig. 1
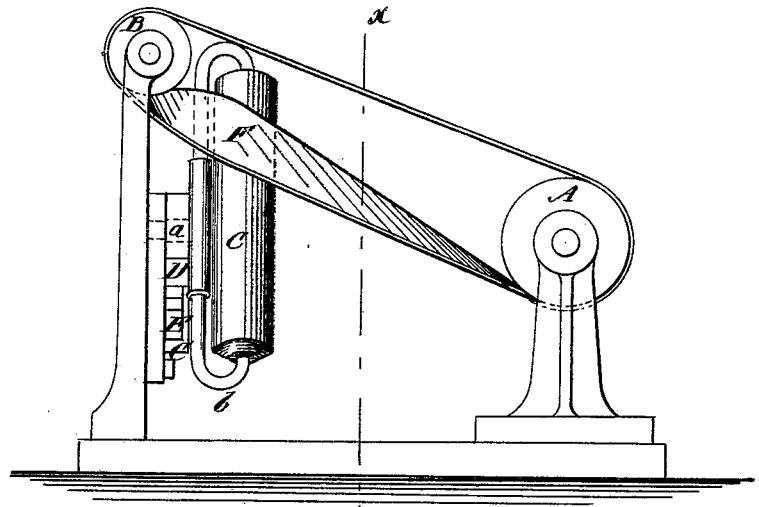
Fig. 2
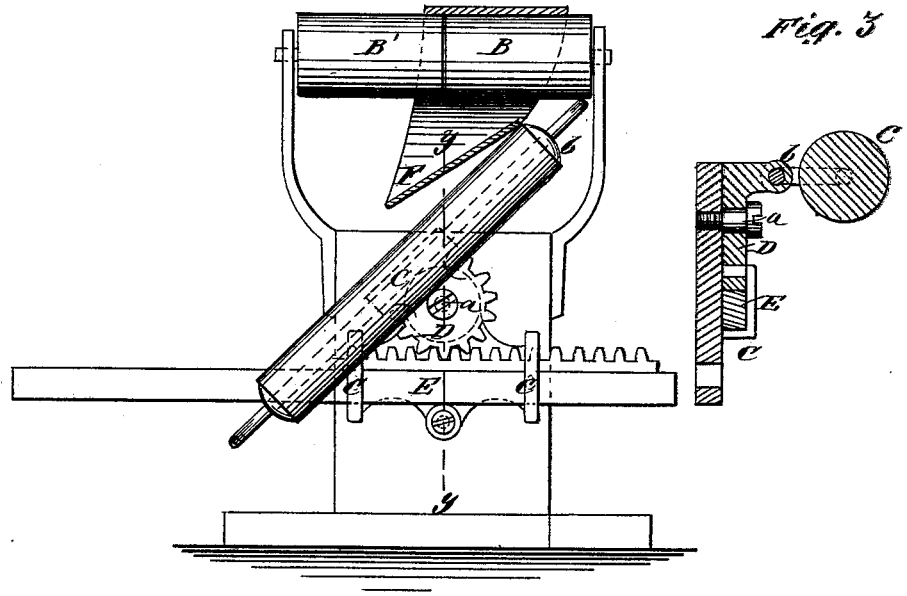
Fig. 3
WITNESSES:
C. Neveux
John Goethals
INVENTOR:
A. Crosby
BY
ATTORNEYS.

UNITED STATES PATENT OFFICE.

AUGUSTINE CROSBY, OF BENTON, MAINE.

IMPROVEMENT IN BELT-SHIFTERS.

Specification forming part of Letters Patent No. 181,049, dated August 15, 1876; application filed July 22, 1876.

*To all whom it may concern:*

Be it known that I, AUGUSTINE CROSBY, of Benton, county of Kennebec and State of Maine, have invented a new and Improved Belt-Shifter, of which the following is a specification:

Figure 1 is a side elevation. Fig. 2 is a section on line $x\ x$, Fig. 1, and Fig. 3 is a section through $y\ y$ in Fig. 2.

My invention relates to apparatuses for shifting belts for stopping or starting machinery; and it consists of a roller supported in a frame that is placed parallel with and near the tight and loose pulleys on the counter-shaft, and is pivoted so that the roller may be made to bear against either side of the belt according to the direction in which the belt is to be shifted. It further consists of an arrangement of a rack and toothed sector, by means of which the roller is moved.

Similar letters of reference indicate corresponding parts.

A is a pulley on the driving-shaft, and B B′ are pulleys on the counter-shaft. C is a roller, turning in a frame, $b$, that is attached to a toothed sector, D, which is journaled or pivoted at $a$. A rack, E, supported by the guides $c\ c$, engages with the sector D. F is the belt running from the pulley A to the pulleys B B′.

By moving the rack E the roller C is made to bear obliquely against the edge of the belt F, causing it to run from one pulley to the other. The advantages claimed for my invention are, that with it belts can be shifted without being subjected to wear. It is particularly adapted to rubber belts, as it does not chafe them. It shifts the belt smoothly without jarring or noise.

Having thus described my invention, I claim as new and desire to secure by Letters Patent—

The combination of the roller C, frame $b$, sector D, rack E, substantially as shown and described.

AUGUSTINE CROSBY.

Witnesses:
   E. R. HUNT,
   P. H. RICHARDSON.